United States Patent
Biller et al.

[15] 3,691,238
[45] Sept. 12, 1972

[54] PROCESS FOR THE TREATING CRUDE ALKYLATED PHENOLS

[72] Inventors: Efim Biller, Fribourg, Switzerland; Rudolf Huettner, Cologne Raderberg; Gunter Velling, Hersel near Bonn, both of Germany

[73] Assignee: Union Rheinische Braunkohlen Kraftstoff Aktienzesellschaft, Wesseling near Cologne, Germany

[22] Filed: Sept. 29, 1967

[21] Appl. No.: 671,552

[52] U.S. Cl. .......................... 260/621 A, 260/624 A
[51] Int. Cl. ............................................. C07c 37/22
[58] Field of Search ....... 260/621, 621 A, 627, 624 A

[56] References Cited

UNITED STATES PATENTS

| | | | |
|---|---|---|---|
| 1,887,662 | 11/1932 | Read | 260/624 |
| 2,029,539 | 2/1936 | Niederl | 260/624 |
| 2,039,344 | 5/1936 | Putnam et al | 260/624 |
| 2,082,625 | 6/1937 | Hart | 260/624 |
| 2,172,415 | 9/1939 | Stewart | 260/627 |
| 2,334,691 | 11/1943 | Anderson | 260/621 X |

*Primary Examiner*—Leon Zitver
*Assistant Examiner*—Norman Morgenstern
*Attorney*—Connolly & Hutz

[57] ABSTRACT

A process for the recovery of alkyl phenols from their reaction mixtures by treating said reaction mixtures with an inert water-insoluble organic solvent, separating the resulting aqueous catalyst containing layer from the organic layer, passing the organic layer along with water over zinc carbonate, separating the resulting aqueous layer from the organic layer, washing the organic layer with water, separating the aqueous layer from the organic layer and distilling pure alkyl phenol from the organic layer.

5 Claims, No Drawings

PROCESS FOR THE TREATING CRUDE ALKYLATED PHENOLS

FIELD OF INVENTION

This invention relates to a process for treating crude alkylated phenols.

DESCRIPTION OF PRIOR ART

One known process for the production of alkyl phenols comprises reacting phenol with an alcohol or an ether in the presence of a catalytically-active aqueous solution of a zinc halide, such as zinc chloride and, in particular, zinc bromide, whose activity is intensified by the addition of a small quantity of a hydrogen halide, HBr in particular. This reaction is preferably carried out at elevated pressures and temperatures. The mixture formed during the reaction separates after cooling and depressurization into an organic layer and an aqueous layer containing the catalyst, although separation is by no means complete on account of the respective solubility ratios. Small quantities of zinc halide and hydrogen halide remaining in the organic layer present considerable difficulties during working up by distillation of the organic layer, which mainly comprises unreacted phenol, cresols and xylenols. These impurities can promote polymerization during the distillation. In addition, the products isolated cannot always be employed for all purposes, for example, when they contain traces of hydrogen halide.

It is not possible to remove the impurities, for example, zinc bromide and hydrogen bromide, from the organic layer by carefully washing it with water, because this form of purification is not complete and involves unreasonable expense. By neutralization with alkalis some of the catalyst would be lost, and in view of the relatively high cost of the catalysts, it is highly desirable that they should be recycled as completely as possible. For these reasons, it has so far never been possible in practice effectively to separate, from the aqueous layer, the organic reaction products resulting from the aforementioned alkylation reaction or to obtain really pure products.

SUMMARY OF THE INVENTION

It has now been found that pure products can be recovered from the reaction mixture obtained by the alkylation of phenol with methanol or ethanol or the corresponding ethers or alkyl halides in the presence of a catalytically active aqueous solution of zinc chloride or zinc bromide and a small amount of hydrogen chloride or hydrogen bromide at elevated pressure and temperature without a loss of catalyst. The present invention provides a process for treating the reaction mixture obtained by the said alkylation which comprises passing the organic layer obtained at atmospheric pressure from the reaction mixture after the addition of an inert water-insoluble organic solvent with water over a solid basic zinc compound, washing the thus treated organic layer with water, and recovering the pure products from the organic layer by distillation.

DETAILED DESCRIPTION OF INVENTION

In the process according to the invention it is preferred to use the aqueous layer obtained from the reaction mixture containing the catalytically active substances and the water used for washing for preparing a catalyst solution for recycling by suitably distilling off water and optionally adding hydrogen halide.

Therefore, it is preferred to add to the reaction mixture an inert water-insoluble organic solvent before or after depressuring the reaction product to atmospheric pressure, separating the aqueous catalyst-containing layer from the organic phase, passing the organic phase with water over a solid basic zinc compound, again separating the aqueous layer from the organic layer, washing the organic layer with water in one or more stages, preparing a catalyst suitable for recycling into the alkylation reaction from the aqueous layer containing the catalytically active substances and the water used for washing by suitable distilling off water and optionally adding hydrogen halide, and working up the residual organic layer by distillation to recover the pure products.

Following separation by distillation of the water of reaction formed, these catalytic substances may be recycled to the reaction. It can be of advantage to use some of the water of reaction separated by distillation as fresh water for the last washing stage. To avoid losses, it is of advantage to let the fresh water used for the final washing stage to run in countercurrent through the preceding treatment stages so that it accumulates as much zinc bromide, for example, as possible before it is used to regenerate the catalyst. Washing may be carried out in one or several stages in any form known per se, for example in washing towers or in agitation vessels. In addition, it can be of advantage, following the first separation of the aqueous layer from the organic layer, to wash the organic layer with water before it is treated with solid basic zinc compound for example, zinc carbonate for which purpose one or more stages may again be used in the usual way.

Depending on the effectiveness of the separating and washing stages, the throughput rate through the vessels containing zinc carbonate for example may be high, for example 10 to 100 liters per liter of catalyst.

Suitable inert water-insoluble solvents for the organic layer include, for example, benzene and cyclohexane, although other solvents normally used for purposes such as these, for example toluene, hexane and octane, may also be employed. The solvent passes to the distillation stage together with the organic layer and is there separated.

A crude alkylate which is treated in this way before the individual products are separated by distillation is completely free from the aforementioned catalytic substances.

EXAMPLE

Phenol and methanol in a molar ratio of 1:0.6 were alkylated in the usual way in the presence of an aqueous catalyst solution containing zinc bromide and hydrogen bromide. Approximately 2 parts by volume of cyclohexane were added for every three parts by volume of the reaction mixture obtained. The aqueous catalyst-containing layer deposited was separated. The organic phase which, apart from the cyclohexane, consisted mainly of unreacted phenol, cresols and xylenols in addition to some higher alkylated products, was washed with water, passed through a vessel filled with zinc carbonate chips (throughput 40 liters per liter of chips) and rewashed. The water used for the final washing stage was passed through the zinc carbonate vessel to the first washing stage, combined with the aqueous catalyst-containing layer initially separated, and worked up by distillation to the catalyst solution to be recycled. There were no zinc bromide losses, whilst the loss of HBr was less than 0, 1 percent. The resulting organic layer was free from zinc bromide and HBr and was readily separated into the individual compounds by distillation.

What we claim is:

1. In the process for treating the reaction mixture obtained from the alkylation of phenol with methanol, ethanol, the corresponding ethers or the corresponding alkyl halides in the presence of a catalytically active aqueous solution of zinc chloride or zinc bromide and hydrogen chloride or hydrogen bromide at elevated temperature and pressure to recover pure alkyl phenol, the improvement which comprises adding to the reaction product after the reaction is completed an inert water-insoluble organic solvent selected from the group consisting of benzene, cyclohexane, toluene, hexane and octane before or after depressurizing the reaction product to atmospheric pressure, separating the resulting aqueous catalyst-containing layer from the organic phase, passing the organic phase with water over zinc carbonate, separating the resulting aqueous layer from the organic layer, washing the organic layer with water, preparing a catalyst solution from the aqueous layer containing the catalytically active substances and the water used for washing by distilling off water and recycling the resulting solution to the alkylation reaction and working up the residual organic layer by distillation to recover pure alkyl phenol.

2. A process as claimed in claim 1, wherein following its first separation from the aqueous layer, the organic layer is washed with water in one or more stages.

3. A process as claimed in claim 2, wherein the fresh water required for washing is delivered to the final washing stage and, after passing through the preceding treatment stages, is delivered to the first separation stage either wholly or in part before the aqueous catalyst system is regenerated by distillation.

4. A process as claimed in claim 1, wherein the organic solvent is cyclohexane or benzene.

5. A process as claimed in claim 1, wherein hydrogen halide is added to the aqueous catalyst solution prior to recycling said aqueous catalyst solution to the alkylation reaction.

* * * * *